(12) United States Patent
Lii

(10) Patent No.: US 7,576,732 B2
(45) Date of Patent: Aug. 18, 2009

(54) SCROLL CONTROL METHOD USING A TOUCHPAD

(75) Inventor: Jia-Yih Lii, Taichung (TW)

(73) Assignee: Elan Microelectronics Corporation, Hsinchu (TW)

( * ) Notice: Subject to any disclaimer, the term of this patent is extended or adjusted under 35 U.S.C. 154(b) by 682 days.

(21) Appl. No.: 11/274,179

(22) Filed: Nov. 16, 2005

(65) Prior Publication Data

US 2006/0290678 A1    Dec. 28, 2006

(30) Foreign Application Priority Data

Jun. 23, 2005   (TW)   ............................... 94121041 A

(51) Int. Cl.
*G06F 3/041* (2006.01)
(52) U.S. Cl. ...................................... 345/173; 345/157

(58) Field of Classification Search ................. 345/173, 345/157, 178; 178/18.01–19.03; 715/856
See application file for complete search history.

(56) References Cited

U.S. PATENT DOCUMENTS 5,327,161 A * 7/1994 Logan et al. ................. 345/157
5,880,717 A * 3/1999 Chan et al. ................... 345/173

* cited by examiner

*Primary Examiner*—Regina Liang
*Assistant Examiner*—Shaheda A Abdin
(74) *Attorney, Agent, or Firm*—Rosenberg, Klein & Lee

(57) ABSTRACT

A scroll control method using a touchpad comprises predefining a region on a touchpad, whereby a scroll function will be triggered by a landing of an object on the region, and terminated by a leaving of the object from the touchpad. During the scroll function is executed, the moving distance of the object sliding on the touchpad is calculated to determine a corresponding scrolling signal.

10 Claims, 3 Drawing Sheets

SCROLL CONTROL METHOD USING A TOUCHPAD

FIELD OF THE INVENTION

The present invention is related generally to a touchpad and more particularly to a scroll control method using a touchpad.

BACKGROUND OF THE INVENTION

Touchpad has been widely applied in various electronic products, such as hand-held computer, personal digital assistant (PDA), mobile phone, and other electronic systems. A touchpad is used for an input device for a finger or conductive object to slide or touch thereon to control a cursor in relative movement or absolute coordinate movement, or to support other extended functions, for example key or button simulation.

For a touchpad to support more extended functions, a technique of region division has been proposed. For the purpose of providing better operational environment, all of the current computer systems and hand-held devices have adopted window interfaces, and these window interfaces all have evolved to operate in a scroll environment. Conventional touchpads have also provided the corresponding function for scroll control of a window on a computer system. FIG. 1 shows a conventional touchpad 10, on which three regions are divided for a cursor control region 12, a vertical scroll region 14, and a horizontal scroll region 16. When a user slides his finger 18 on the cursor control region 12, the cursor on a corresponding window will move. Sliding the finger 18 on the vertical scroll region 14 causes a corresponding window to scroll upward or downward. Also, sliding the finger 18 on the horizontal scroll region 16 causes a corresponding window to scroll leftward of rightward. The further detail operations of such touchpad are referred to U.S. Pat. Nos. 5,748,185 and 5,943,052.

However, the extended functions will not be executed unless the user touches the predefined corresponding regions since the region division of the touchpad 10 is explicit. For example, if there is a need to execute the vertical scroll function, the finger 18 must slide within the vertical scroll region 14. When the finger 18 slides from the vertical scroll region 14 into the cursor control region 12, the touchpad 10 stops the vertical scroll function since it recognizes that the user desires to execute the general cursor control function by detecting the location of the user's finger 18. Besides, a continuous movement can only define a scrolling direction, such as vertical scrolling direction. If the user desires to execute the horizontal scroll function, he must shift his finger 18 to the horizontal scroll region 16 first. That causes inconvenience of use.

Accordingly, it is desired a control method for executing scroll function in any position of a touchpad.

SUMMARY OF THE INVENTION

One object of the present invention is to provide a scroll control method using a touchpad for executing scroll function in any position of the touchpad.

In accordance with the present invention, a scroll control method using a touchpad comprises predefining at least a region on the touchpad to trigger a scroll function in response to a landing of an object on the at least a region. In one embodiment, the scroll function allows for the object to slide on the touchpad in any directions, and a scrolling signal is determined thereby and may include both horizontal and vertical directions for scrolling a window at a same time. Alternatively, the direction of a scrolling signal is determined depending on the horizontal and vertical components in a moving distance of the object. If the horizontal component is greater than the vertical one, the scrolling signal is determined to have a horizontal direction. On the contrary, if the horizontal component is smaller than the vertical one, the scrolling signal is determined to have a vertical direction. In one embodiment, the touchpad does not terminate the scroll function until the object leaves from the touchpad.

BRIEF DESCRIPTION OF DRAWINGS

These and other objects, features and advantages of the present invention will become apparent to those skilled in the art upon consideration of the following description of the preferred embodiment of the present invention taken in conjunction with the accompanying drawing, in which.

DETAILED DESCRIPTION OF THE INVENTION

Figure 2:
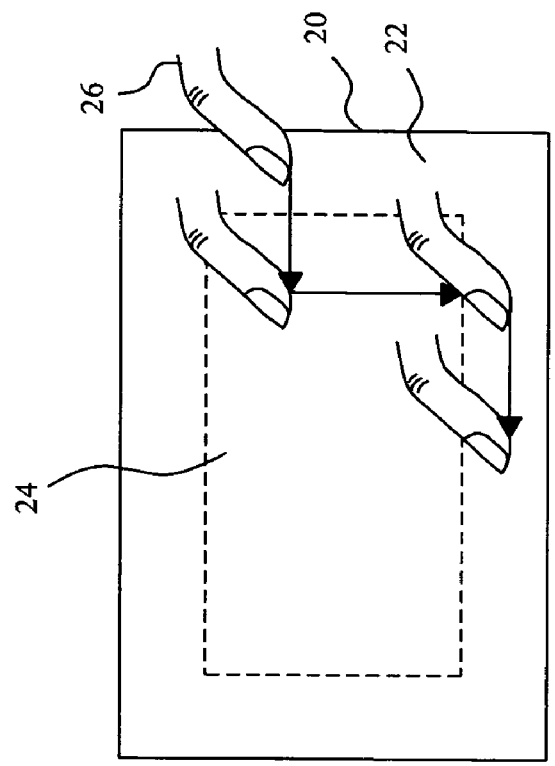
FIG. 2 shows a first embodiment of a touchpad according to the present invention.
Figure 1:
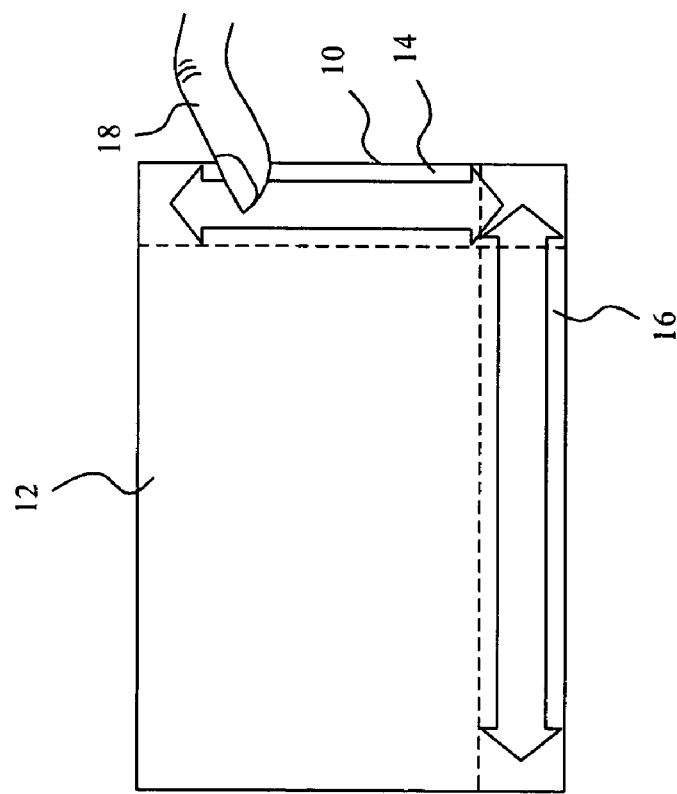
FIG. 1 shows a conventional touchpad and the operations thereon.
Figure 3:
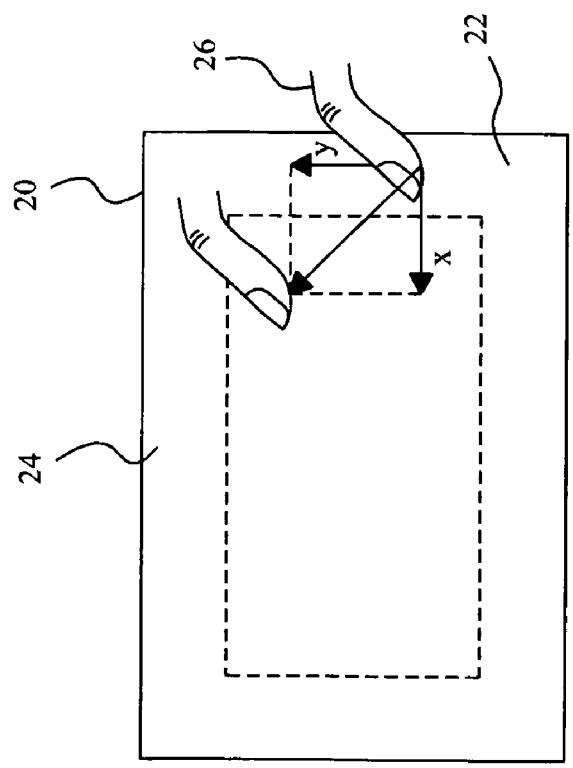
FIG. 3 is a schematic diagram to show an operation of a finger sliding on the touchpad of FIG. 2.

FIG. 2 shows a touchpad 20 according to the present invention, on which a region 22 to trigger a scroll function and a cursor control region 24 are defined. When user's finger 26 lands on the touchpad 20, the touchpad 20 detects the landed position first. If this landed position is located within the cursor control region 24, the touchpad 20 executes general cursor control function, by which the movement of the user's finger 26 causes corresponding movement of a cursor on a window. If the landed position is located within the region 22, the touchpad 20 executes the scroll function, by which the movement of the user's finger 26 causes corresponding scroll control of the window. Once the scroll function is triggered, the window can be scrolled by sliding the user's finger 26 anywhere on the touchpad 20. The scroll function will not be terminated even if the user's finger 26 slides from the region 22 into the cursor control region 24, as shown in FIG. 2. As a result, the user can execute horizontal and vertical scrolling operations by a continuous movement. When the finger 26 slides on the touchpad 20, the moving distance will be calculated. In a movement of the finger 26, as shown in FIG. 3, if the horizontal moving distance x is greater than the vertical moving distance y, the touchpad 20 sends out a scrolling signal for horizontally scrolling the window. On the contrary, if the horizontal moving distance x is smaller than the vertical moving distance y, the touchpad 20 sends out a scrolling signal for vertically scrolling the window. In another embodiment, the scrolling signal may scroll the window in horizontal and vertical directions simultaneously by a movement on the touchpad 20, depending on the horizontal moving distance x and vertical moving distance y.

Figure 4:
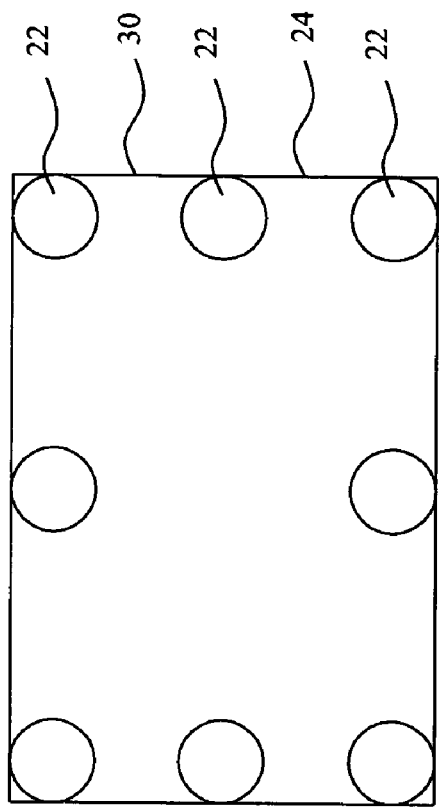
FIG. 4 shows a second embodiment of a touchpad according to the present invention.
Figure 6:
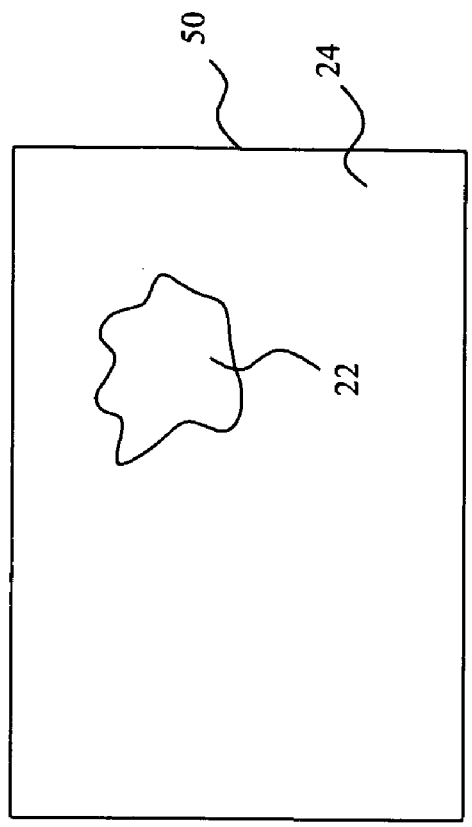
FIG. 6 shows a fourth embodiment of a touchpad according to the present invention.
Figure 5:
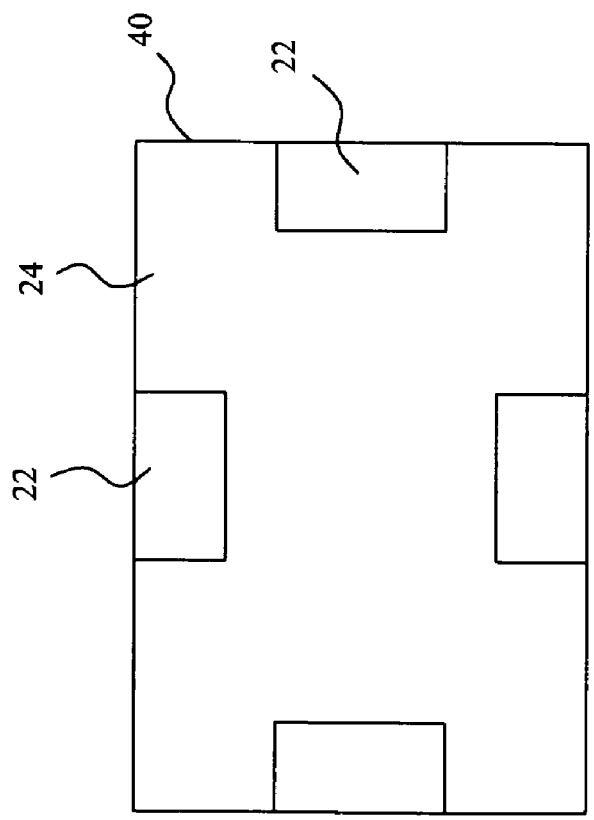
FIG. 5 shows a third embodiment of a touchpad according to the present invention.

The region 22 can be defined on the edge of the touchpad 20 and surrounds the cursor control region 24. In addition, the region 22 can be defined with any shape and in any position. Moreover, the region 22 can include several subregions. For example, as shown in FIG. 4, the region 22 to trigger a scroll function comprises several circular subregions on the edge of a touchpad 30. In FIG. 5, the region 22 to trigger a scroll function comprises several rectangular subregions on the four edges of a touchpad 40. In FIG. 6, a touchpad 50 comprises a region 22 having an irregular-shape not on the edge of the touchpad 50 to trigger a scroll function.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set fourth in the appended claims.

What is claimed is:

1. A scroll control method using a touchpad, comprising the steps of:
   predefining a region on the touchpad for controlling a scroll function on a window interface, the region being disposed on the touchpad adjacent a second region for cursor control within the window interface;
   detecting a landing of an object on the region;
   triggering the scroll function in response to the landing;
   detecting a movement of the object sliding on the touchpad subsequent to the landing, maintaining the scroll function upon continued sliding of the object into the second region;
   calculating a distance of the movement for determining a scrolling signal responsive thereto; and
   terminating the scroll function in response to a leaving of the object from the touchpad.

2. The method of claim 1, wherein the step of calculating a distance of the movement for determining a scrolling signal comprises the steps of:
   analyzing the distance for evaluating a horizontal component and a vertical component thereof; and
   determining the scrolling signal to have a horizontal or vertical direction depending on the horizontal component greater or smaller than the vertical component.

3. The method of claim 1, wherein the step of calculating a distance of the movement for determining a scrolling signal comprises the steps of:
   analyzing the distance for evaluating a horizontal component and a vertical component thereof; and
   determining the scrolling signal to have a horizontal scrolling component and a vertical scrolling component proportional to the horizontal component and the vertical component, respectively.

4. The method of claim 1, wherein the region comprises at least a subregion having a regular or irregular shape.

5. The method of claim 1, wherein the region comprises a plurality of subregions distributed on the touchpad.

6. A touchpad for scroll control on a window, comprising:
   a region predefined thereon for controlling a scroll function on the window, the region being disposed on the touchpad adjacent a second region for cursor control within the window;
   wherein the scroll function is triggered in response to a landing of an object on the region, and a moving distance of the object subsequently sliding on the touchpad is calculated for the touchpad to send out a scrolling signal responsive thereto;
   wherein the scroll function maintained with continued sliding of the object into the second region, and terminated in response to a leaving of the object from the touchpad.

7. The touchpad of claim 6, wherein the scrolling signal has a horizontal direction when the moving distance has a horizontal component greater than a vertical component, and has a vertical direction when the horizontal component is smaller than the vertical component.

8. The touchpad of claim 6, wherein the scrolling signal comprises a horizontal scrolling component and a vertical scrolling component proportional to a horizontal component and a vertical component of the moving distance, respectively.

9. The touchpad of claim 6, wherein the region comprises at least a subregion having a regular or irregular shape.

10. The method of claim 6, wherein the region comprises a plurality of subregions distributed on the touchpad.

\* \* \* \* \*